US011888213B2

(12) United States Patent
Kang et al.

(10) Patent No.: US 11,888,213 B2
(45) Date of Patent: Jan. 30, 2024

(54) MOBILE TERMINAL

(71) Applicant: LG ELECTRONICS INC., Seoul (KR)

(72) Inventors: Yunmo Kang, Seoul (KR); Kangjae Jung, Seoul (KR); Sungjoon Hong, Seoul (KR); Byungwoon Jung, Seoul (KR); Sungjung Rho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 79 days.

(21) Appl. No.: 17/557,489

(22) Filed: Dec. 21, 2021

(65) Prior Publication Data

US 2022/0115771 A1 Apr. 14, 2022

Related U.S. Application Data

(63) Continuation of application No. 17/004,681, filed on Aug. 27, 2020, now Pat. No. 11,233,314, which is a (Continued)

(30) Foreign Application Priority Data

Sep. 19, 2012 (KR) ........................ 10-2012-0104152

(51) Int. Cl.
*H01Q 1/24* (2006.01)
*H01Q 21/30* (2006.01)
(Continued)

(52) U.S. Cl.
CPC ............... *H01Q 1/243* (2013.01); *H01Q 1/38* (2013.01); *H01Q 1/48* (2013.01); *H01Q 1/50* (2013.01);
(Continued)

(58) Field of Classification Search
CPC .... H01Q 1/242-245; H01Q 5/50; H01Q 7/00; H01Q 9/26; H01Q 13/10; H01Q 21/30
See application file for complete search history.

(56) References Cited

U.S. PATENT DOCUMENTS 9,160,058 B2 10/2015 Tsou et al.
9,287,612 B2 3/2016 Bolin et al.
(Continued)

FOREIGN PATENT DOCUMENTS

KR 1020090033596 4/2009
KR 1020100032681 3/2010
(Continued)

OTHER PUBLICATIONS

U.S. Appl. No. 17/004,681, Office Action dated Dec. 23, 2020, 16 pages.

(Continued)

*Primary Examiner* — Ricardo I Magallanes
*Assistant Examiner* — Amal Patel
(74) *Attorney, Agent, or Firm* — LEE, HONG, DEGERMAN, KANG & WAIMEY

(57) ABSTRACT

A mobile terminal comprises: a terminal body; and a first antenna device and a second antenna device disposed at one side of the terminal body in an adjacent manner, and formed to operate at different frequency bands, wherein the first antenna device and the second antenna device are provided with conductive members each having a slit at one side thereof, and wherein the conductive members form part of an appearance of the terminal body.

13 Claims, 13 Drawing Sheets

Related U.S. Application Data continuation of application No. 16/752,485, filed on Jan. 24, 2020, now Pat. No. 10,790,575, which is a continuation of application No. 16/033,083, filed on Jul. 11, 2018, now Pat. No. 10,573,957, which is a continuation of application No. 15/860,427, filed on Jan. 2, 2018, now Pat. No. 10,056,680, which is a continuation of application No. 14/010,900, filed on Aug. 27, 2013, now Pat. No. 9,871,286.

(51) Int. Cl.

| | |
|---|---|
| ***H01Q 5/50*** | (2015.01) |
| ***H01Q 9/26*** | (2006.01) |
| ***H01Q 7/00*** | (2006.01) |
| ***H01Q 5/35*** | (2015.01) |
| ***H01Q 13/10*** | (2006.01) |
| ***H01Q 1/38*** | (2006.01) |
| ***H01Q 1/48*** | (2006.01) |
| ***H01Q 1/50*** | (2006.01) |

(52) U.S. Cl.

CPC ................ *H01Q 5/35* (2015.01); *H01Q 5/50* (2015.01); *H01Q 7/00* (2013.01); *H01Q 9/26* (2013.01); *H01Q 13/10* (2013.01); *H01Q 21/30* (2013.01)

(56) References Cited

U.S. PATENT DOCUMENTS

| | | | |
|---|---|---|---|
| 9,819,071 | B2 | 11/2017 | Nguyen |
| 9,871,286 | B2 | 1/2018 | Kang et al. |
| 2011/0025578 | A1 | 2/2011 | Chang |
| 2012/0105287 | A1 | 5/2012 | Jung et al. |
| 2012/0112969 | A1 | 5/2012 | Caballero et al. |
| 2012/0176278 | A1 | 7/2012 | Merz et al. |
| 2012/0206302 | A1 | 8/2012 | Ramachandran et al. |
| 2012/0309473 | A1* | 12/2012 | Choo .................... G06F 1/1656 455/575.1 |
| 2013/0257659 | A1* | 10/2013 | Darnell .................. H05K 1/028 343/702 |
| 2013/0342411 | A1 | 12/2013 | Jung et al. |
| 2014/0078008 | A1 | 3/2014 | Kang et al. |
| 2017/0054200 | A1 | 2/2017 | Kang et al. |
| 2018/0131077 | A1 | 5/2018 | Kang et al. |
| 2018/0323497 | A1 | 11/2018 | Kang et al. |
| 2020/0161747 | A1 | 5/2020 | Kang et al. |
| 2020/0395654 | A1 | 12/2020 | Kang et al. |

FOREIGN PATENT DOCUMENTS

| | | |
|---|---|---|
| KR | 1020120097877 | 9/2012 |
| KR | 20150081691 | 7/2015 |
| KR | 20150098448 | 8/2015 |

OTHER PUBLICATIONS

U.S. Appl. No. 14/010,900, Final Office Action dated Apr. 1, 2016, 8 pages.

U.S. Appl. No. 14/010,900, Office Action dated Sep. 16, 2015, 18 pages.

Korean Intellectual Property Office Application No. 10-2012-0104152, Notice of Allowance dated May 20, 2019, 2 pages.

Korean Intellectual Property Office Application Serial No. 10-2020-0146292, Notice of Allowance dated Aug. 23, 2022, 6 pages.

U.S. Appl. No. 15/346,505, Office Action dated Feb. 14, 2017, 20 pages.

U.S. Appl. No. 15/860,427, Notice of Allowance dated Apr. 10, 2018, 22 pages.

U.S. Appl. No. 16/033,083, Notice of Allowance dated Oct. 3, 2019, 32 pages.

* cited by examiner

MOBILE TERMINAL

CROSS-REFERENCE TO RELATED APPLICATIONS

This application is a continuation of U.S. patent application Ser. No. 17/004,681, filed on Aug. 27, 2020, which is a continuation of U.S. patent application Ser. No. 16/752,485, filed on Jan. 24, 2020, now U.S. Pat. No. 10,790,575, which is a continuation of U.S. patent application Ser. No. 16/033,083, filed on Jul. 11, 2018, now U.S. Pat. No. 10,573,957, which is a continuation of U.S. patent application Ser. No. 15/860,427, filed on Jan. 2, 2018, now U.S. Pat. No. 10,056,680, which is a continuation of U.S. patent application No. Ser. No. 14/010,900, filed on Aug. 27, 2013, now U.S. Pat. No. 9,871,286, which claims the benefit of earlier filing date and right of priority to Korean Application No. 10-2012-0104152, filed on Sep. 19, 2012, the contents of which are all hereby incorporated by reference herein in their entirety.

BACKGROUND OF THE DISCLOSURE

1. Field of the Disclosure

The present invention relates to a mobile terminal, and particularly, to a mobile terminal having an antenna device capable of transmitting and receiving (transceiving) radio signals.

2. Background of the Disclosure

A mobile terminal is a portable electronic device that can be carried anywhere and have at least one function of performing voice and video calls, inputting/outputting information, storing data, etc.

As the mobile terminal becomes multifunctional, the mobile terminal can be allowed to capture still images or moving images, play music or video files, play games, receive broadcast, etc., so as to be implemented as an integrated multimedia player.

Various attempts have been made to implement complicated functions in such a multimedia device by means of hardware or software. For instance, is being provided a user interface (UI) environment for allowing a user to search for or select a function in easier and more convenient manners.

Besides such attempts, a method for enhancing a function of hardware may be considered. Such method includes structural changes and improvements for allowing a user to conveniently use the mobile terminal. As the structural changes and improvements, an antenna capable of transmitting and receiving (transceiving) electric waves may be considered.

An antenna is a device configured to transmit and receive (transceive) radio electromagnetic waves for radio communications, which is an absolutely-required component of the mobile terminal. The mobile terminal is provided with various functions such as WiBro and DMB, rather than a voice call. Therefore, the antenna should implement bandwidths for satisfying such functions, and should be designed to have a small size so as to be mounted in the mobile terminal.

To meet such demand, antennas capable of implementing multi frequency bands are being designed. However, the antennas have complicated structures, and it is difficult to independently control parameter values which determine antenna characteristics such as the resonant frequency, the bandwidth and the gain. In order to solve such problems, research on an antenna having a new structure is actively ongoing.

SUMMARY OF THE DISCLOSURE

Therefore, an aspect of the detailed description is to provide a mobile terminal having an antenna device capable of transceiving radio electromagnetic wave in a multi frequency band.

Another aspect of the detailed description is to provide a mobile terminal having an antenna device of more enhanced efficiency and a smaller size.

To achieve these and other advantages and in accordance with the purpose of this specification, as embodied and broadly described herein, there is provided a mobile terminal, comprising: a terminal body; and a first antenna device and a second antenna device disposed at one side of the terminal body in an adjacent manner, and formed to operate at different frequency bands, wherein the first antenna device and the second antenna device are provided with conductive members each having a slit at one side thereof, and wherein the conductive members form part of an appearance of the terminal body.

According to an embodiment of the present disclosure, the conductive members may comprise a first conductive member having a first slit at one side thereof, and a second conductive member having a second slit at one side thereof, wherein the first conductive member may be included in the first antenna device and the second conductive member may be included in the second antenna device.

According to an embodiment of the present disclosure, the first antenna device may comprise a third conductive member which forms a slot together with the first conductive member, such that the slot is communicated with the first slit; a first feeding portion which forms an electric field in the slot such that the first antenna device resonates in a first frequency band; and a first feeding extension portion extending from the first feeding portion such that the first antenna device resonates in a second frequency band.

According to an embodiment of the present disclosure, a length of the slot, which is from a first connection part between the first conductive member and the third conductive member, to the first slit, may be $\lambda/4$ or $\lambda/8$ with respect to a wavelength of a center frequency of the first frequency band.

According to an embodiment of the present disclosure, the feeding portion may be spaced from the first connection part by a first distance, and the feeding extension portion may extend from the feeding portion by a second distance.

According to an embodiment of the present disclosure, the first distance may be formed such that an impedance of the center frequency of the first frequency band is within 50 ohm by the feeding portion, and the second distance is formed such that an impedance of a center frequency of the second frequency band is within 50 ohm by the feeding extension portion.

According to an embodiment of the present disclosure, the third conductive member may be implemented as a flexible printed circuit board (FPCB) having a ground, and the FPCB having one end connected to a circuit board mounted in the terminal body.

According to an embodiment of the present disclosure, the second antenna device may comprise a fourth conductive member which forms a slot together with the second conductive member, such that the slot is communicated with the second slit; a second feeding portion which forms an electric field in the slot such that the second antenna device resonates in a third frequency band; and a second feeding extension portion extending from the second feeding portion such that the second antenna device resonates in a fourth frequency band.

According to an embodiment of the present disclosure, a length of the slot, which is from a second connection part between the second conductive member and the fourth conductive member, to the second slit, may be λ/4 or λ/8 with respect to a wavelength of a center frequency of the third frequency band.

According to an embodiment of the present disclosure, the fourth conductive member may be implemented as a flexible printed circuit board (FPCB) having a ground, and the FPCB having one end connected to a circuit board mounted in the terminal body.

According to an embodiment of the present disclosure, the first antenna device and the second antenna device may be disposed below the terminal body, and a socket mounted in the terminal body and connectable to an external device may be disposed between the first conductive member and the second conductive member.

According to an embodiment of the present disclosure, the first slit and the second slit may be formed to be open toward a lower end of the terminal body.

According to an embodiment of the present disclosure, the first antenna device may comprise a third member which forms a first conductive loop together with the first conductive member; a first feeding portion connected to the first conductive loop so as to feed the first conductive loop; and a first grounding connector connected to the first conductive loop so as to ground-connect the first conductive loop.

According to an embodiment of the present disclosure, a length of the first conductive loop may be λ/2 or λ/4 with respect to a wavelength of the center frequency of the first frequency band, such that the first antenna device operates as a folded dipole antenna.

According to an embodiment of the present disclosure, the second antenna device may comprise a fourth member which forms a second conductive loop together with the second conductive member; a second feeding portion connected to the second conductive loop so as to feed the second conductive loop; and a second grounding connector connected to the second conductive loop so as to ground-connect the second conductive loop.

According to an embodiment of the present disclosure, a length of the second conductive loop may be λ/2 or λ/4 with respect to a wavelength of the center frequency of the second frequency band, such that the second antenna device operates as a folded dipole antenna.

According to an embodiment of the present disclosure, one of the antenna devices may operate as a slot antenna.

According to an embodiment of the present disclosure, one of the antenna devices may operate as a folded dipole antenna.

According to an embodiment of the present disclosure, non-conductive members may be coupled to the slits so as to cover the slits.

According to another aspect of the present disclosure, there is provided a mobile terminal, comprising: a conductive case which forms an appearance of a terminal body; and a plurality of antenna devices disposed at one side of the terminal body in an adjacent manner, and formed to operate at different frequency bands, wherein the antenna devices are provided with conductive members each having a slit at one side thereof, and wherein the conductive members are implemented as part of the conductive case.

The mobile terminal according to the present disclosure can have the following advantages.

Firstly, as the mobile terminal scarcely has lowering of antenna efficiency due to an electric device disposed at the periphery thereof, the mobile terminal can be designed more freely.

Secondly, as the grounds of the antenna devices are independent from each other and radio signals radiate in different directions, the mobile terminal can reduce mutual coupling and an envelope correction coefficient between the antenna devices.

Thirdly, as a main radiation section of the antenna is formed in a lengthwise direction, toward outside from a lower end of the mobile terminal, lowering of a radiation characteristic at a high frequency band, due to a hand effect, can be reduced.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings. The suffixes "module" and "unit or portion" for components used in the following description merely provided only for facilitation of preparing this specification, and thus they are not granted a specific meaning or function. For the sake of brief description with reference to the drawings, the same or equivalent components will be provided with the same reference numbers, and description thereof will not be repeated. Singular expressions include plural expressions which do not have any obviously different meaning in view of a context.

The mobile terminal according to the present disclosure may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present disclosure may be also applicable to a fixed terminal such as a digital TV and a desktop computer.

Figure 1:
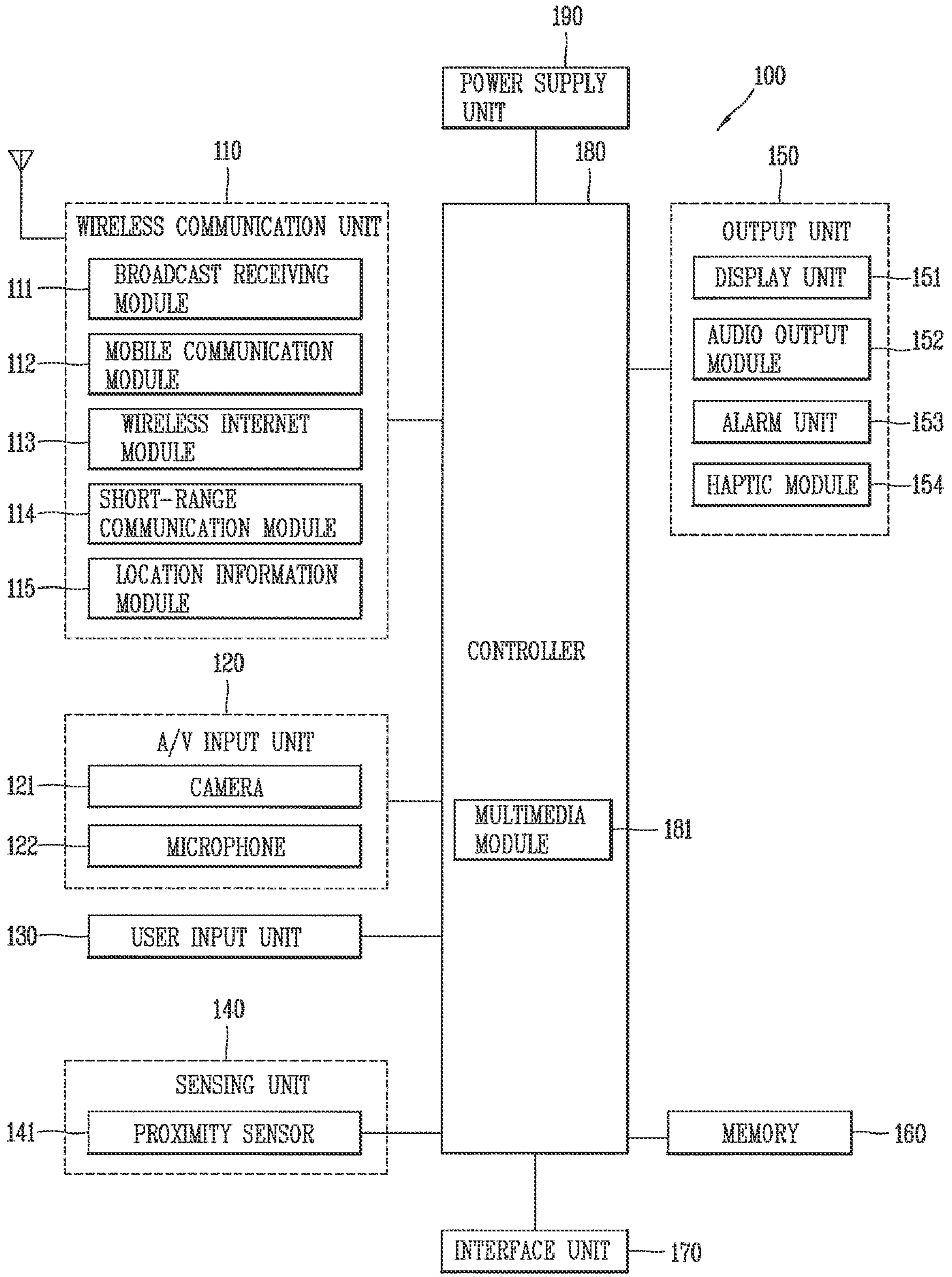
FIG. 1 is a block diagram of a mobile terminal according to an embodiment of the present disclosure.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image frames such as still images or moving images acquired by an image sensor in a video call mode or an image capturing mode. The processed image frames may be displayed on a display unit 151.

The image frames processed by the camera 121 may be stored in the memory 160 or transmitted to the outside via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated while receiving and transmitting audio signals.

The user input unit 130 may generate input data for allowing a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, or a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under such configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, capacitance type proximity sensor, a magnetic type proximity sensor, an infrared rays proximity sensor, and so on. When the touch screen is implemented as capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100.

Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
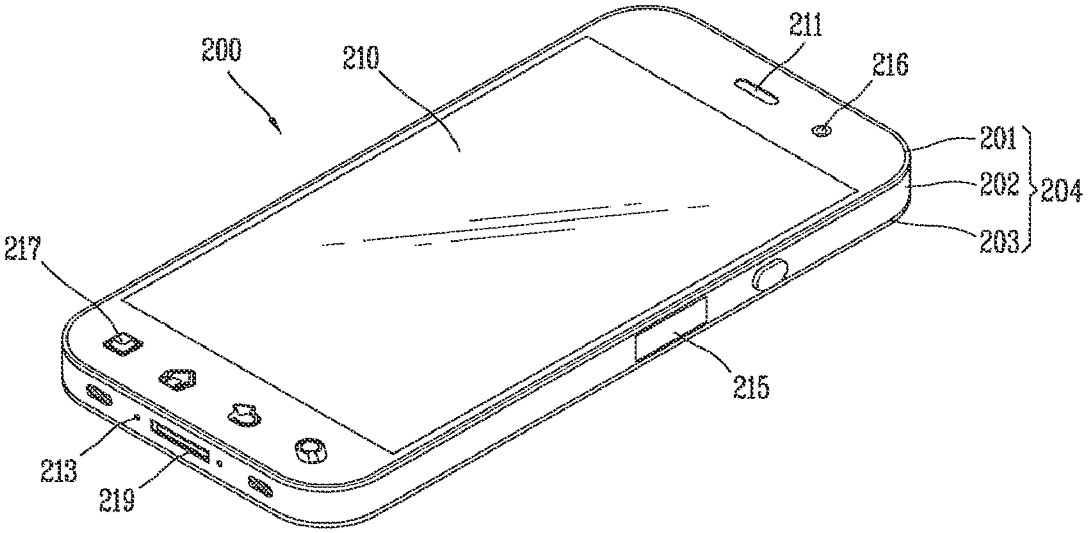
FIG. 2 is a front perspective view of a mobile terminal according to an embodiment of the present disclosure.
Figure 3:
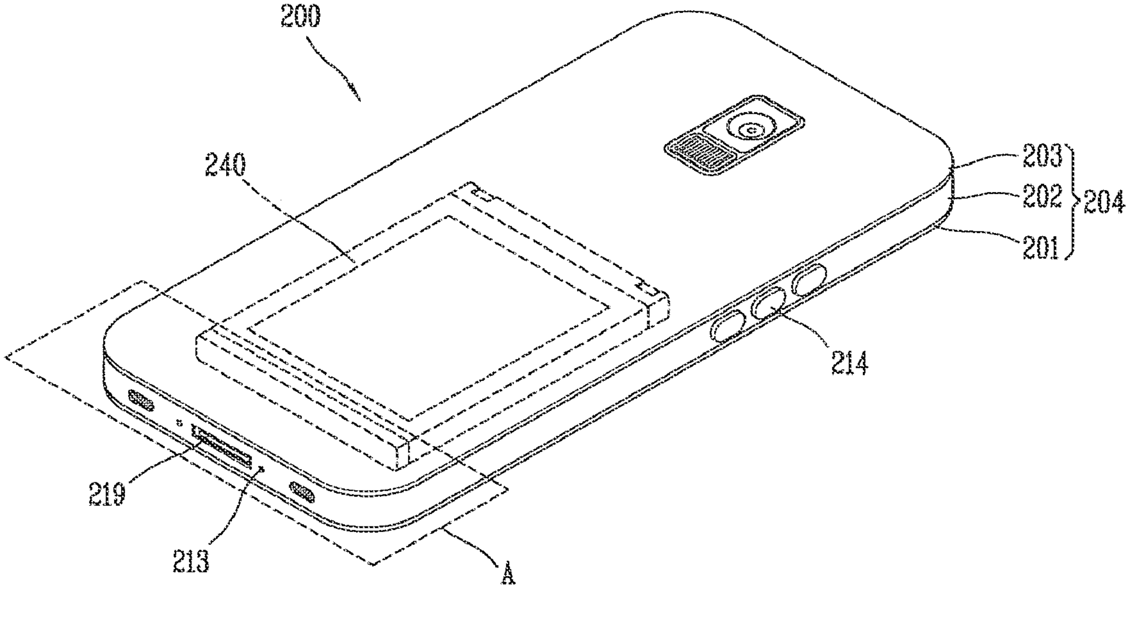
FIG. 3 is a rear perspective view of the mobile terminal of FIG. 2.

FIG. 2 is a front perspective view of a mobile terminal according to the present disclosure, and FIG. 3 is a rear perspective view of the mobile terminal of FIG. 2.

Referring to FIGS. 2 and 3, the mobile terminal 200 according to the present disclosure is provided with a bar type terminal body 204. However, the present disclosure is not limited to this, but may be applied to a slide type in which two or more bodies are coupled to each other so as to perform a relative motion, a folder type, a swing type, and the like. Further, the mobile terminal of the present disclosure may be applied to any portable electronic device having a camera and a flash, for instance, a portable phone, a smart phone, a notebook computer, a digital broadcasting terminal, Personal Digital Assistants (PDAs), Portable Multimedia Players (PMO), etc.

The mobile terminal 200 includes a terminal body 204 which forms the appearance thereof.

A case (casing, housing, cover, etc.) which forms the appearance of the terminal body 204 may include a front case 201, a rear case 202, and a battery cover 203 for covering the rear surface of the rear case 202.

A space formed by the front case 201 and the rear case 202 may accommodate various components therein. Such cases may be formed by injection-molded synthetic resin, or may be formed using a metallic material such as stainless steel (STS) or titanium (Ti).

On the front surface of the terminal body 204, may be disposed a display unit 210, a first audio output unit 211, a front camera 216, a side key 214, an interface unit 215, and a user input unit 217.

The display unit 210 includes a liquid crystal display (LCD) module, organic light emitting diodes (OLED) module, e-paper, etc., each for visually displaying information. The display unit 210 may include a touch sensing means for inputting information in a touch manner. Hereinafter, the display unit 210 including the touch sensing means is called 'touch screen'. Once part on the touch screen 210 is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 2, the touch screen 210 occupies most of the front surface of the front case 201.

The first audio output unit 211 may be implemented as a receiver for transmitting a call sound to a user's ear, or a loud speaker for outputting each type of alarm sound or a playback sound of multimedia.

The front camera 216 processes image frames such as still images or moving images, acquired by an image sensor in a video call mode or a capturing mode. The processed image frames may be displayed on the display unit 210.

The image frames processed by the front camera 216 may be stored in the memory 160, or may be transmitted to the outside through the wireless communication unit 110. The front camera 216 may be implemented in two or more according to a user's interface.

The user input unit 217 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 217 may be implemented as a dome switch, or a touch screen, or a touch pad for inputting commands or information in a user's push or touch manner. Alternatively, the user input unit 217 may be implemented, for example, as a wheel for rotating a key, a jog, or a joystick. The user input unit 217 is configured to input various commands such as START, END and SCROLL.

A side key 214, an interface unit 215, an audio input unit 213, etc. are disposed on the side surface of the front case 201.

The side key 214 may be called 'manipulation unit', and may be configured to receive commands for controlling the operation of the mobile terminal 200. The side key 214 may include any type of ones that can be manipulated in a user's tactile manner. Content input by the side key 214 may be variously set. For instance, through the side key 214, may be input commands such as controlling the front and rear cameras 216 and 221, controlling the level of sound output from the audio output unit 211, and converting a current mode of the display unit 210 into a touch recognition mode.

The audio output unit 213 may be implemented as a microphone for receiving a user's voice, other sound, etc.

The interface unit 215 serves a path through which the mobile terminal 200 performs data exchange, etc. with an external device. For example, the interface unit 215 may be at least one of a connection terminal through which the mobile terminal 200 is connected to an ear phone by cable or radio, a port for local area communication, e.g., an infrared data association (IrDA) port, a Bluetooth portion, a wireless LAN port, and power supply terminals for supplying power to the mobile terminal 200. The interface unit 215 may be a card socket for accommodating an external card such as a subscriber identification module (SIM) card, a user identity module (UIM) card or a memory card for storing information.

A power supply unit 240 and the rear camera 221 are disposed on the rear surface of the body 204.

A flash 222 and a mirror (not shown) may be disposed close to the rear camera 221. When capturing an object by using the rear camera 221, the flash 222 provides light onto the object.

When the user captures an image of himself/herself by using the rear camera 221, the mirror can be used for the user to look at himself/herself therein.

The rear camera 221 may face a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front camera 216 and the rear camera 221 may be installed at the terminal body 204 so as to rotate or pop-up.

The power supply unit 240 is configured to supply power to the mobile terminal 200. The power supply unit 240 may be mounted in the terminal body 204, or may be detachably mounted to the terminal body 204.

Figure 4:
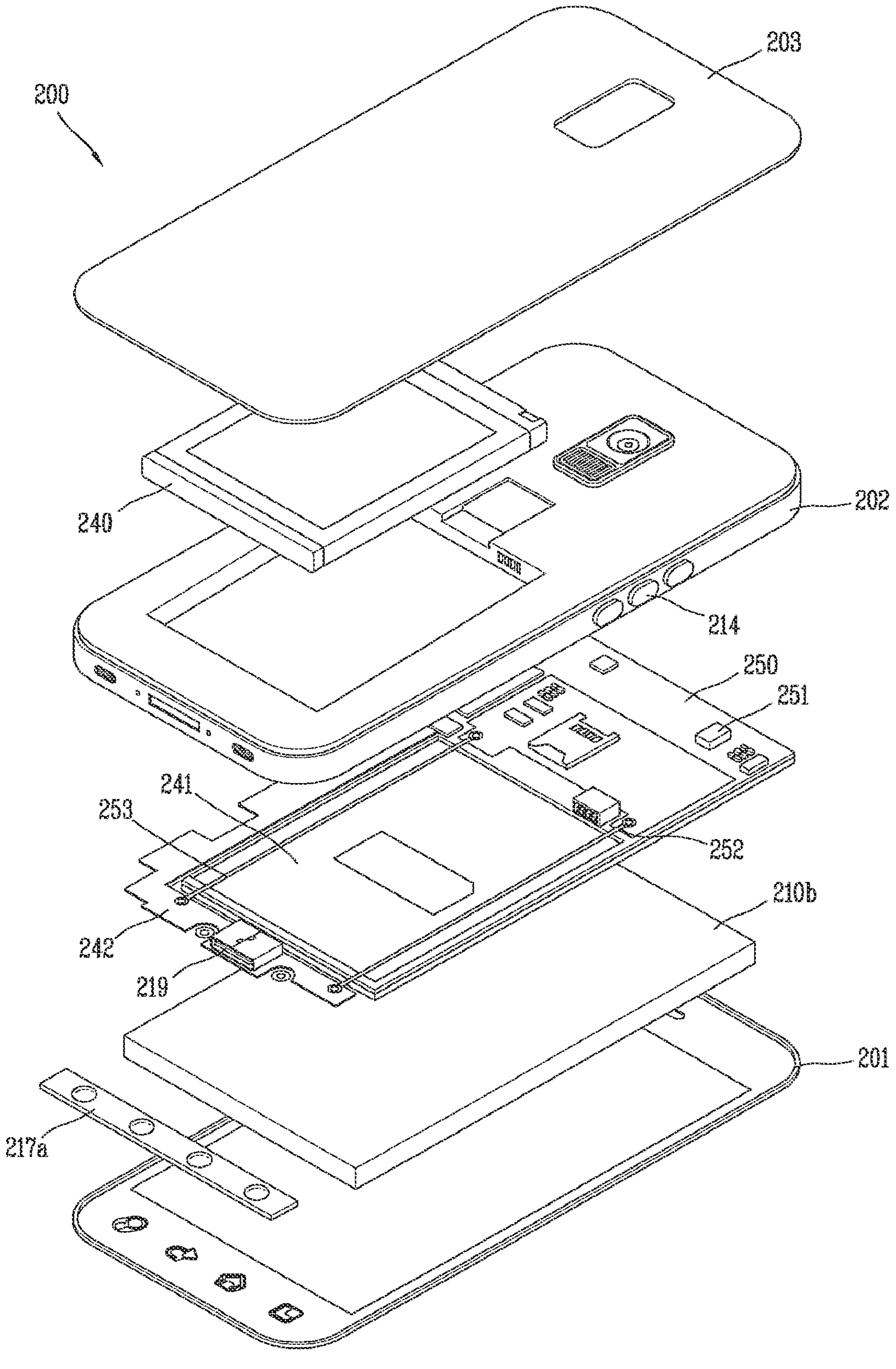
FIG. 4 is an exploded perspective view of FIG. 3.

FIG. 4 is an exploded perspective view of the mobile terminal of FIG. 3.

Referring to FIG. 4, the mobile terminal includes a window 210*a* and a display module 210*b* which constitute the display unit 210. The window 210*a* may be coupled to one surface of the front case 201.

A frame 241 is formed between the front case 201 and the rear case 202 so as to support electric devices. The frame 241, a structure for supporting inside of the mobile terminal, is formed so as to support at least one of the display module 210*b*, the camera module 221, the antenna device, the battery 240 and a circuit board 250.

Part of the frame 241 may be exposed to outside of the mobile terminal. The frame 241 may constitute part of a sliding module for connecting a body part with a display part in a slide type mobile terminal rather than a bar type mobile terminal.

Referring to FIG. 4, the circuit board 250 is disposed between the frame 241 and the rear case 202, and the display module 210*b* is coupled to one surface of the frame 241. The circuit board 250 and the battery may be disposed on another surface of the frame 241, a battery case 203 for covering the battery may be coupled to the rear case 202.

The window 210*a* is coupled to one surface of the front case 201. A touch sensor (nor shown) may be mounted to the window 210*a*. The touch sensor is configured to sense a touch input, and is formed of a transmissive material. The touch sensor may be mounted to the front surface of the window 210*a*, and may be configured to convert a change of a voltage, etc. occurring on a specific part of the window 210*a*, into an electric input signal.

The display module 210*b* is mounted to the rear surface of the window 210*a*. In this embodiment, the display module 210*b* is implemented as a thin film transistor-liquid crystal display (TFT LCD). However, the present disclosure is not limited to this.

For instance, the display module 210*b* may be implemented as a liquid crystal display (LCD), an organic light-emitting diode (OLED), a flexible display, a 3D display, etc.

As aforementioned, the circuit board 250 may be formed on one surface of the frame 241, but may be mounted below the display module 210*b*. At least one electronic device is mounted onto the lower surface of the circuit board 250.

A battery accommodation portion for accommodating the battery 240 therein is recessed from the frame 241. A contact terminal connected to the circuit board 250 may be formed on one side surface of the battery, so that the battery 240 can supply power to the terminal body.

An antenna device may be formed on an upper end or a lower end of the mobile terminal. The antenna device may be formed in plurality in number, and the plurality of antenna devices may be disposed at the respective ends. The antenna devices may be configured to transmit and receive radio signals in different frequency bands.

The frame 241 may be formed of a metallic material so as to have a sufficient strength even in a small thickness. The frame 241 formed of a metallic material may operate as a ground. That is, the circuit board 250 or the antenna device may be ground-connected to the frame 241, and the frame 241 may operate as a ground of the circuit board 250 or the antenna device. In this case, the frame 241 may extend a ground of the mobile terminal.

The circuit board 250 is electrically connected to the antenna device, and is configured to process radio signals (or radio electromagnetic waves) transmitted and received by the antenna device. For processing of radio signals, a plurality of transceiving circuits may be mounted to the circuit board 250.

The transceiving circuits may include one or more integrated circuits and related electric devices. As an example, the transceiving circuits may include a transmission integrated circuit, a reception integrated circuit, a switching circuit, an amplifier, etc.

As the plurality of transceiving circuits simultaneously feed conductive members formed in conductive patterns, a plurality of antenna devices may simultaneously operate. For instance, while one of the transceiving circuits performs signal transmission, another may perform signal reception. Alternatively, both of the transceiving circuits may perform signal transmission or signal reception.

Coaxial cables 252 and 253 may be formed to connect the circuit board 250 with the antenna devices. For instance, the coaxial cables 251 and 252 may be connected to feeding devices for feeding the antenna devices. The feeding devices may be formed on one surface of a flexible printed circuit board (FPCB) 242 for processing signals input from the user input unit 217. Another surface of the FPCB 242 may be coupled to a signal transmission unit 217*a* for transmitting signals of the user input unit 217. In this case, a dome may be formed on another surface of the FPCB 242, and an actuator may be formed at the signal transmission unit 217*a*.

Figure 5A:
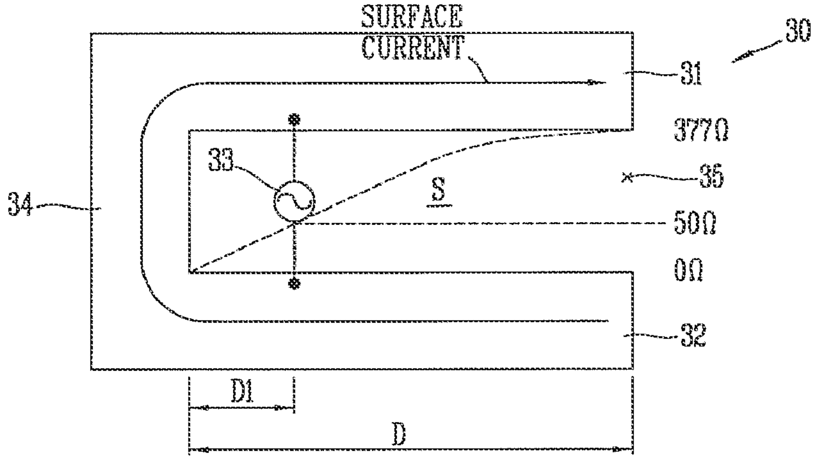
FIGS. 5A and 5B are conceptual views illustrating comparative embodiments of an antenna device according to the present disclosure.
Figure 5B:
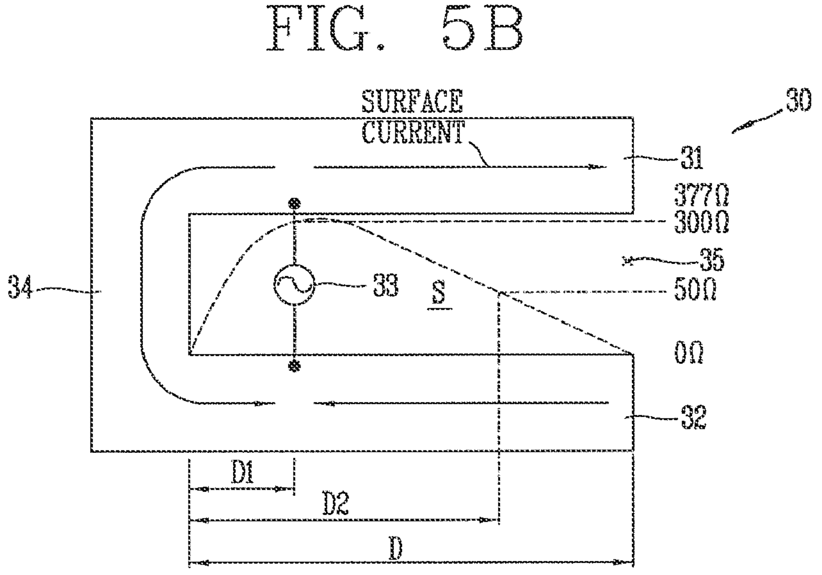
Figure 5C:
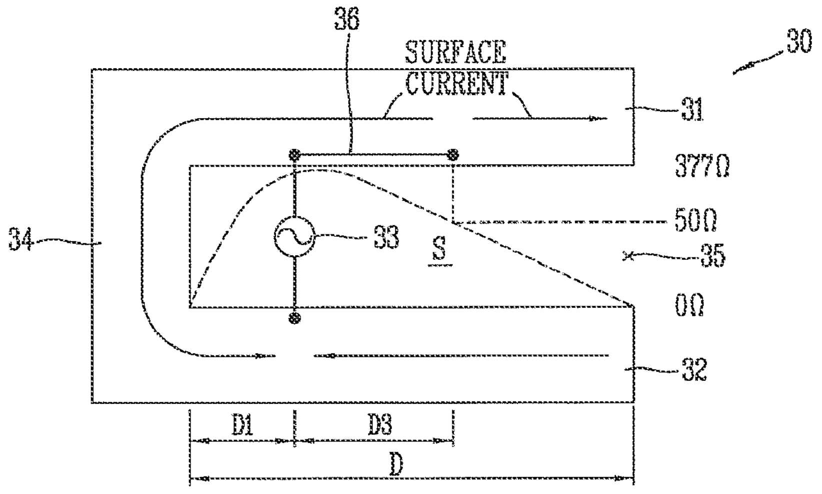
FIG. 5C is a conceptual view of a slot antenna of an antenna device according to the present disclosure.

FIGS. 5A and 5B are conceptual views illustrating comparative embodiments of an antenna device according to the present disclosure, and FIG. 5C is a conceptual view of a slot antenna of an antenna device according to the present disclosure.

One of the antenna devices according to comparative embodiments is transformed from a slot antenna, which is configured to transceive radio signals while resonating in a plurality of frequency bands. Generally, a slot antenna has a structure that a slot is formed on a wall surface of a wave guide, a surface of a cylindrical conductor, or a planar conductor plate, and the slot is fed so that an electric field can be formed in the slot. Under such configuration, the slot antenna operates as a radiator. Such general slot antenna has been used to process radio signals in a single frequency band, rather than in a plurality of frequency bands. The reason will be explained with reference to FIGS. 5A and 5B.

FIGS. 5A and 5B are a first comparative embodiment and a second comparative embodiment of the present disclosure, which show a slot antenna 30 having one open side, respectively. The slot antenna 30 is configured to resonate in a low frequency band, with a shorter slot length (D) than a slot antenna having two closed sides, due to a mirror effect. That is, the slot antenna having one open side can resonate in the same frequency band, with a length corresponding to about ½ a length of a slot antenna having two closed sides.

In case of a slot antenna having two closed sides, a slot has a length corresponding to $\lambda/2$ with respect to a wavelength of a center frequency of a first frequency band, in order to radiate radio waves in the first frequency band. In case of a slot antenna having one open side, a slot has a length corresponding to $\lambda/4$ with respect to a wavelength of a center frequency. That is, the slot antenna having one open side can have a minimized size, because it can radiate radio waves corresponding to radio signals in a low frequency band, with a slot of a shorter length.

FIG. 5A illustrates a relation between an impedance and a current when the slot antenna 30 radiates radio waves in a first frequency band. Here, the dotted line indicates the size of an impedance, and the arrow indicates a current flowing along the slot.

A first member 31 and a second member 32 form a slot (S).

A length (D) of the slot (S) corresponds to $\lambda/4$ with respect to a wavelength of a center frequency of a first frequency band. An impedance of the antenna device, by which radio waves radiate, has a value about 377 ohm, and impedance matching is performed at one open side 35 of the slot. Since impedance matching of an antenna is performed at about 50 ohm, a feeding portion 33 is spaced from one closed side 34 by a prescribed distance (D1).

FIG. 5B illustrates an impedance and a current flow when radio waves radiate in a second frequency band by the antenna of FIG. 5A. The length (D) of the slot corresponds to $\lambda/2$ with respect to a wavelength of a center frequency of a second frequency band. An impedance of the antenna device where radio waves radiate has a value about 377 ohm, and impedance matching is performed at a central part of the slot in a lengthwise direction.

Unless the feeding portion 33 has a displacement, the position of the feeding portion 33 in a first frequency band for impedance matching, corresponds to a position where an impedance of about 300 ohm can be implemented in a second frequency band. On the contrary, an impedance matching position in a second frequency band is spaced from a closed part of the slot by a prescribed length (D2).

Accordingly, if the position of the feeding portion 33 is not changed, it is difficult to perform impedance matching for allowing the slot antenna to have efficiency more than a prescribed value in a second frequency band.

That is, if the feeding portion 33 is positioned in a first frequency band for impedance matching, it is difficult to perform impedance matching in a second frequency band. Therefore, an antenna performance satisfied in a second frequency band cannot be obtained.

In order to solve such problem, there is provided an antenna device according to an embodiment of the present disclosure as shown in FIG. 5C. Referring to FIG. 5C, the antenna device is provided with a feeding extension portion 36 extending from the feeding portion 33.

The feeding extension portion 36 extends from the feeding portion 33 so that an impedance can be about 50 ohm, in a case where the slot antenna operates in a second frequency band. That is, the feeding portion 33 is displaced at a position where an impedance is 50 ohm, in a case where the slot antenna operates in a first frequency band. The feeding extension portion 36 extends from the feeding portion 33 by a prescribed length (D3) so that an impedance can be 50 ohm, in a case where the slot antenna operates in a second frequency band.

The antenna device according to the present disclosure can have impedance matching so that antenna efficiency more than a prescribed value can be implemented in a plurality of frequency bands, without using a balun or a diplexer.

The mobile terminal according to the following embodiments is provided with a plurality of antenna devices at one side thereof.

The antenna devices are configured to transceive signals in different frequency bands.

For instance, a first antenna device (ANT 1) may be configured to transceive DCN 1× type or PCS 1× type signals, and a second antenna device (ANT 2) may be configured to transceiver DCN EVDO (Evolution-Data Optimized or Evolution-Data Only) type signals.

If the first antenna device (ANT 1) transceives LTE B4 type signals, the second antenna device (ANT 2) may transceive LTE B13 type signals.

Alternatively, if the first antenna device (ANT 1) transceives signals corresponding to voice service of the mobile terminal, the second antenna device (ANT 2) may transceive data signals corresponding to LTE service of the mobile terminal.

Figure 6:
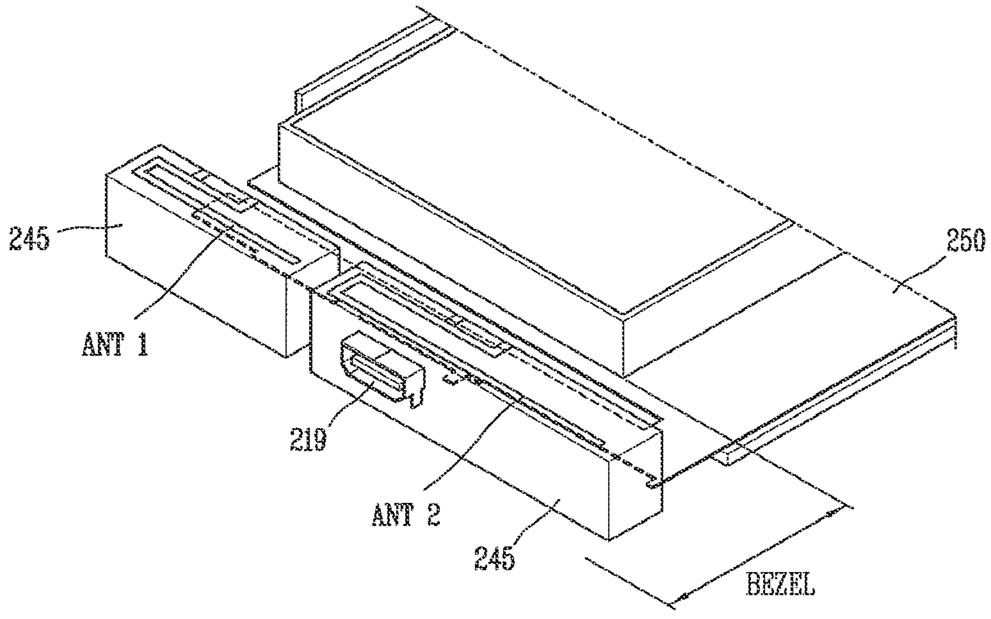
FIG. 6 is a view illustrating a comparative embodiment of an antenna device according to the present disclosure.

FIG. 6 is a view illustrating a comparative embodiment of an antenna device according to the present disclosure. Especially, FIG. 6 illustrates antenna devices formed at part 'A' in the mobile terminal shown in FIG. 3.

Referring to FIG. 6, each of a first antenna device (ANT 1) and a second antenna device (ANT 2) is implemented as one of a monopole type antenna, a dipole type antenna and a PIFA type antenna. The first antenna device (ANT 1) and the second antenna device (ANT 2) may be disposed at one side of the mobile terminal in an adjacent manner. Radiators of the first antenna device (ANT 1) and the second antenna device (ANT 2) may be implemented as a carrier 245 and a conductive pattern formed on one surface of the carrier 245.

Since main radiation from the first antenna device (ANT 1) and the second antenna device (ANT 2) is performed at one end of the conductive pattern, the main radiation may be influenced by peripheral electric devices where an electric field or a magnetic field is generated. Therefore, the antenna devices should be spaced from the electric devices (e.g., a socket, a display module or an FPCB). In a case where the mobile terminal is provided therein with the plurality of antenna devices (ANT 1 and ANT 2), the antenna devices should be spaced from electric devices. This may cause an inner space of the mobile terminal where the antenna devices can be arranged, to be narrow. Further, if such space is not obtained, the antenna devices may have a lowered performance. This may cause a difficulty in miniaturizing the mobile terminal.

Figure 7A:
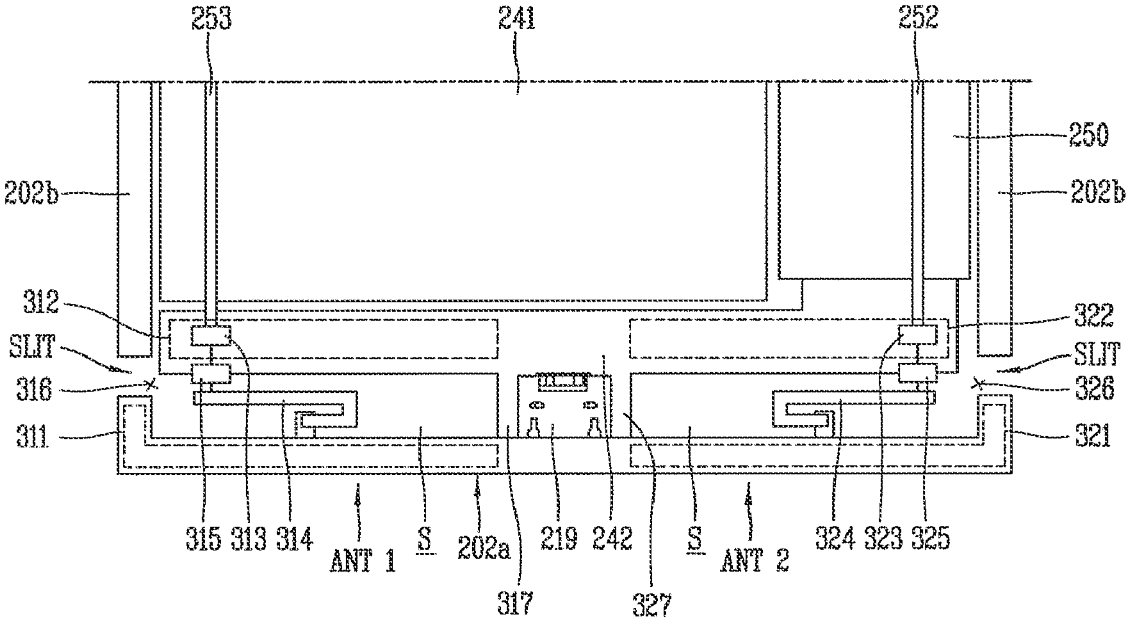
FIGS. 7A and 7B are conceptual views of a mobile terminal having antenna devices according to a first embodiment of the present disclosure.
Figure 7B:
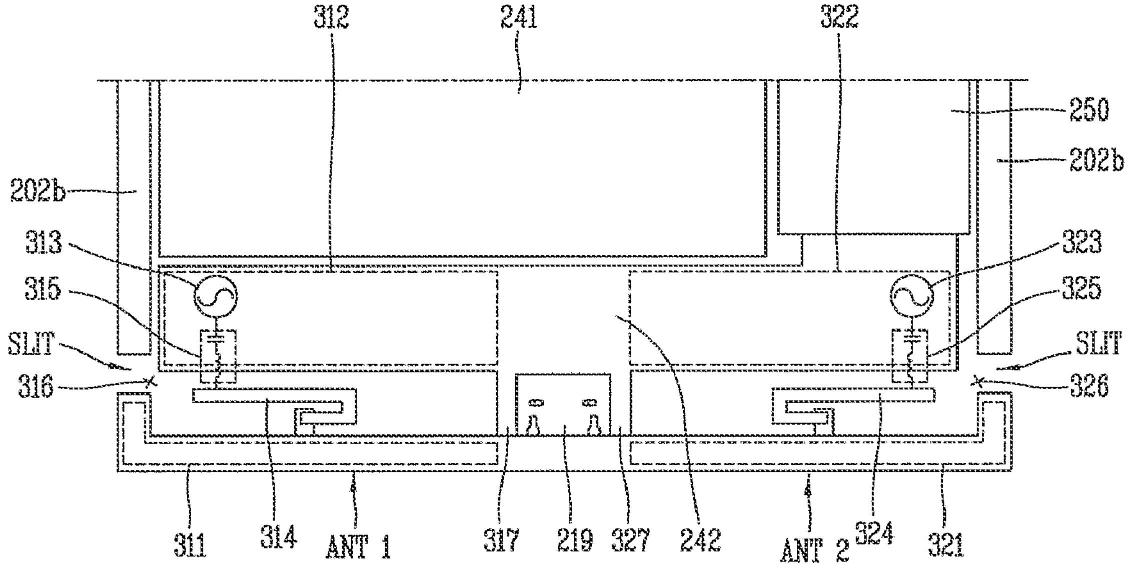
Figure 7C:
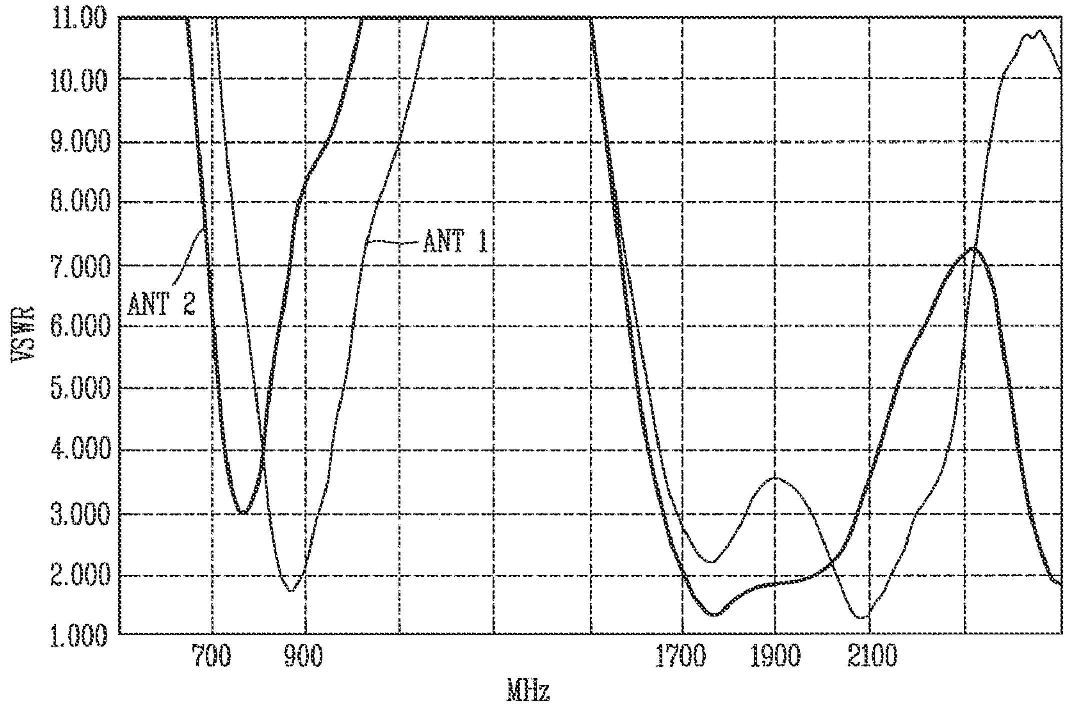
FIG. 7C is a view illustrating a voltage standing wave ratio (VSWR) according to a frequency of the antenna devices of FIG. 7A.

FIGS. 7A and 7B are conceptual views of a mobile terminal having antenna devices according to a first embodiment of the present disclosure, and FIG. 7C is a view illustrating a voltage standing wave ratio (VSWR) according to a frequency of the antenna devices of FIG. 7A. Especially, FIGS. 7A and 7B illustrate antenna devices formed at part 'A' in the mobile terminal shown in FIG. 3.

In FIGS. 7A and 7B, the first antenna device (ANT 1) and the second antenna device (ANT 2) are implemented as the same type of antenna devices. However, the first antenna device (ANT 1) and the second antenna device (ANT 2) may be implemented as different types of antenna devices.

The antenna devices according to a first embodiment are a sort of slot antenna. As aforementioned, each of the antenna devices may comprise members which form a slot, a feeding portion, and a feeding extension portion.

Hereinafter, the first antenna device (ANT 1) will be explained as an example. The first antenna device (ANT 1) may comprise a first conductive member 311, a third conductive member 312, a first feeding portion 313 and a first feeding extension portion 314. Each of the first conductive member 311 and the third conductive member 312 may be configured as a conductive member, and the first conductive member 311 and the third conductive member 312 define a slot (S) of the antenna device. That is, a space between the first conductive member 311 and the third conductive member 312 serves as a slot (S) of the antenna device. An open part of the slot (S) is called an opening 316. A closed part of the slot (S), due to connection between the first conductive member 311 and the third conductive member 312, is called a connector 317.

A length from the opening 316 to the connector 317 of the slot (S) corresponds to λ/4 or λ/8 with respect to a wavelength of a center frequency of a first frequency band. The length of the slot (S) may be changed by an antenna feeding method, a dielectric constant of a dielectric substance of the antenna, or addition of a capacitor of the first feeding portion 313. For instance, in a case where the antenna device operates in a λ/4 resonance mode due to change of a feeding method, the length of the slot may correspond to λ/4 with respect to a wavelength of a center frequency. For a smaller size of the antenna device (ANT 1), the slot (S) may be bent, or the slot (S) may have a meander structure.

For instance, in case of a communication service bandwidth where a first frequency band corresponds to GSM 850, the slot (S) is formed to have a length of about 45~53 mm. In case of a communication service bandwidth where a first frequency band corresponds to LTE 700, the slot (S) is formed to have a length of about 50~60 mm. The length of the slot is in inverse proportion to the center frequency of the first frequency band. That is, the higher the frequency is, the shorter the length of the slot is. Considering efficiency of the antenna device, the width of the slot (S) is required to be at least 0.003λ.

As aforementioned, the length of the slot (S) corresponds to λ/4 with respect to a wavelength of a center frequency of a first frequency band. However, the length of the slot (S) may be shortened due to a matching portion 315 implemented as series elements or shunt elements, which corresponds to λ/8 with respect to a wavelength of the center frequency of the first frequency band. The length of the slot (S) may be increased or decreased by characteristics of components of the antenna device, or by influences from peripheral electric devices of the antenna device.

Each of the first conductive member 311 and the third conductive member 312 has only to be formed of a conductive material. In this embodiment, the first conductive member 311 is implemented as part of a case 202*a* which covers one side of the mobile terminal, and the third conductive member 312 is implemented as a flexible printed circuit board (FPCB) 242 having a ground.

One end of the FPCB 242 according to the following embodiments may be connected to the circuit board 250 having a controller. The FPCB 242 may be connected to the user input unit 217 of the mobile terminal. In this case, the FPCB 242 is formed so that signals generated from the user input unit 217 can be transmitted to the controller of the circuit board 250. For instance, the FPCB 242 may be formed below the user input unit 217 so as to be connected to the user input unit 217. And the FPCB 242 may be formed to contact the user input unit 217.

As the first conductive member 311 is implemented as the case which forms the appearance of the terminal body, a slit communicated with the opening 316 is formed at one side of the first conductive member 311. Through the slit, main radiation from the slot antenna may be performed.

The first feeding portion 313 feeds the slot antenna so that the antenna device can resonate at a specific frequency. More specifically, one end of the first feeding portion 313 may be connected to one of the first conductive member 311 and the third conductive member 312 which defines the slot (S), so that the first feeding portion 313 can form an electric field in the slot (S). Another end of the first feeding portion 313 may be connected to the first feeding extension portion 314.

The first feeding portion 313 may feed the conductive members in a connected manner, or may coupling-feed the conductive members.

According to a direct feeding method, the first feeding portion 313 extending from a coaxial cable 253 (refer to FIG. 4) may extend from one member to another member so as to cross the slot (S). That is, according to a direct feeding method, one end of the first feeding portion 313 may be connected to one member, and another end of the first feeding portion 313 may extend to be connected to the first feeding extension portion 314.

According to a coupling feeding method, the first feeding portion 313 may perform coupling feeding with respect to one of the conductive members, a neighboring member spaced from the first feeding extension portion 314, or the first feeding extension portion 314. The first feeding portion 313 may extend from the third conductive member 312 toward the first conductive member 311. According to a coupling feeding method, one end of the first feeding portion 313 may be connected to the first feeding extension portion 314, and another end of the first feeding portion 313 may be spaced from the first conductive member 311.

As shown in FIG. 5C, the first feeding portion 313 is spaced from the connector 317 by a prescribed distance, so that an impedance of a center frequency of a first frequency band can be about 50 ohm by the first feeding portion 313.

The first feeding extension portion 314 extends from the first feeding portion 313 by a prescribed distance, so that an impedance of a center frequency of a second frequency band can be within 50 ohm by the first feeding extension portion 314. The length of the first feeding extension portion 314 may be properly controlled for impedance matching so that the antenna device 300 can effectively operate. Through tuning, the length of the first feeding extension portion 314 may extend to a distance large enough for an impedance of a center frequency of a second frequency band to be about 150 ohm.

A shunt element or a series element, which includes a capacitor or an inductor for impedance matching, may be formed between the first feeding portion 313 and the first feeding extension portion 314. Part where the shunt element or the series element is formed, may be called a matching portion 315.

The shunt element may control a resistance, a real number part of an impedance. For instance, an inductor may be controlled to have a high resistance, but a capacitor may be controlled to have a low resistance to thus perform impedance matching. The shunt element may be implemented as a lumped constant element between the first feeding portion 313 and the first feeding extension portion 314.

The series element may control a reactance, an imaginary number part of an impedance. For instance, an inductor may be controlled to have a high reactance, but a capacitor may be controlled to have a low reactance to thus perform impedance matching. The series element may be implemented as a lumped constant element between the first feeding portion 313 and the first feeding extension portion 314. That is, a series capacitor may be disposed on one end of the first feeding extension portion 314, or a series inductor may be disposed at part of the first feeding extension portion 314.

In case of comprising a shunt element or a series element, the antenna device may have a more enhanced performance by changing the length or shape of the slot.

For instance, in a case where a shunt capacitor is disposed at the first feeding portion 313 and a series capacitor is disposed at the first feeding extension portion 314, the length of the slot may be formed to correspond to about λ/8 with respect to a wavelength of a center frequency of a first frequency band, due to lowered resistance and reactance. Due to the shortened length of the slot, the antenna device can be more minimized.

FIG. 7B illustrates that the matching portion 315 is implemented as a series device. In a case where a first frequency band (low frequency band) is within the range of about 700~900 MHz, a capacitance may be within the range of 0.7~1.4 pF, and an inductance may be within the range of 5.0~11 nH.

The first feeding extension portion 314 may be coupled to one surface of the third conductive member 312. A dielectric substance may be disposed between the first feeding extension portion 314 and the third conductive member 312. As the dielectric substance, FR-3 and CEM-1 may be used. The FR-3 is made of multiple plies of paper that have been impregnated with an epoxy-resin binder, and the CEM-1 is a composite material that has a paper core impregnated with epoxy resin. Alternatively, the dielectric substance may be implemented as CEM-3, FR-4, FR-5 or GI. The CEM-3 impregnated with epoxy resin has woven glass cloth surfaces, and a core of non-woven matte fiberglass. The FR-4 is constructed on multiple plies of epoxy-resin impregnated woven glass cloth. The FR-5 is constructed on multiple plies of reinforced epoxy-resin impregnated woven glass cloth. The GI is constructed on multiple plies of polyimide-resin impregnated woven glass cloth. Alternatively, the dielectric substance may be implemented as a printed circuit board (PCB).

As shown in FIG. 7A, the first feeding extension portion 314 may be coupled to one surface of the third conductive member 312. As shown in FIG. 5C, the first feeding extension portion 314 may extend from the first feeding portion 313 so that an impedance can be about 50 ohm, in a case where the slot antenna operates in a second frequency band.

In a case where a center frequency of a second frequency band is about 1900 MHz, the first feeding extension portion 314 extending from the first feeding portion 313 may be formed to have a length of 8~13 mm. Such length of the first feeding extension portion 314 may be increased or decreased by an electromagnetic influence from other components of the antenna device. As aforementioned, an insulator or a dielectric substance may be disposed between the first feeding extension portion 314 and the third conductive member 312.

The second antenna device (ANT 2) comprises a second conductive member 321, a fourth conductive member 322, a second feeding portion 323, a second feeding extension portion 324, and a second feeding extension portion 325. The second conductive member 321, the fourth conductive member 322, the second feeding portion 323, and the second feeding extension portion 325 of the second antenna device (ANT 2) have the same configuration as those of the first antenna device (ANT 1), and thus detailed explanations thereof will be omitted.

The first conductive member 311 and the second conductive member 321 form part of the appearance of the terminal body. As shown in FIGS. 7A and 7B, the first conductive member 311 and the second conductive member 321 may be implemented as a case which forms a lower part of the mobile terminal. A socket 219 may be formed between the first conductive member 311 and the second conductive member 321. As aforementioned, the socket 219 is formed to be connectable to an external device.

The third conductive member 312 and the fourth conductive member 322, which are parts of the FPCB 242 having a ground, may share the ground. Alternatively, the third conductive member 312 and the fourth conductive member 322, which are parts of the FPCB 242, may have separate grounds. That is, the third conductive member 312 may be provided with a first ground, and the fourth conductive member 322 may be provided with a second ground.

Alternatively, the third conductive member 312 may be implemented as an upper part of the FPCB 242, and the fourth conductive member 322 may be implemented as a lower part of the FPCB 242. The third conductive member 312 and the fourth conductive member 322 may be provided with separated grounds.

Alternatively, the third conductive member 312 may be implemented as the FPCB 242, and the fourth conductive member 322 may be implemented as the frame 241 which supports inside of the terminal body. In this case, grounds are separated from each other, too.

If the grounds of the first antenna device (ANT 1) and the second antenna device (ANT 2) are independent from each other, the mobile terminal can reduce mutual coupling and an envelope correction coefficient between the first antenna device (main antenna of a transmitting side or a receiving side) and the second antenna device (sub antenna of a receiving side of the MIMO or diversity system).

When the mobile terminal is provided with a plurality of antennas, a problem, antenna to antenna isolation, may occur. However, in this embodiment, the first antenna device (ANT 1) and the second antenna device (ANT 2) are configured to have different radiation directions. That is, the first antenna device (ANT 1) has a first radiation direction, whereas the second antenna device (ANT 2) has a second radiation direction perpendicular to the first radiation direction.

In the preferred embodiments of the present disclosure, even if a plurality of antenna devices operate as a MIMO or diversity system, the mobile terminal can reduce mutual coupling and an envelope correction coefficient between the first antenna device (main antenna of a transmitting side or a receiving side) and the second antenna device (sub antenna of a receiving side of the MIMO or diversity system).

In a case where a plurality of antenna devices mounted to the mobile terminal are slot antennas, the plurality of antenna devices may be implemented in a narrower space than in the conventional mobile terminal. More specifically, the first antenna device and the second antenna device, which operate as slot antennas, are close to each other at a bezel part of the mobile terminal (inner space of the terminal body, which extends from an outer periphery of the display unit to the case of the mobile terminal, refer to FIG. 6). Under such configuration, the bezel part of the terminal body can be reduced, and thus a smaller and compacter mobile terminal having a plurality of antenna devices can be implemented.

Referring to FIG. 7C, even if the first antenna device (ANT 1) and the second antenna device (ANT 2) simultaneously operate at one side of the mobile terminal, they do not influence on each other, and a high antenna efficiency is implemented. Further, each antenna device which operates as a slot antenna has a high antenna efficiency in a multi-frequency band.

Figure 8:
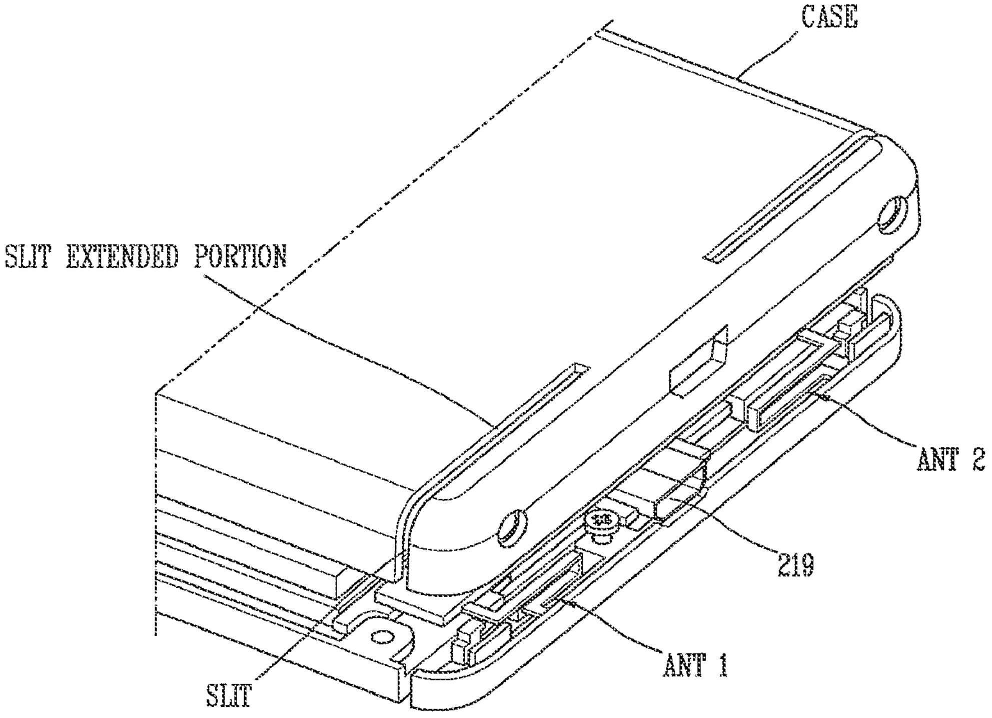
FIG. 8 is a view illustrating an embodiment of a case coupled to part of the mobile terminal of FIG. 7A.

FIG. 8 is a view illustrating an embodiment of a case coupled to part of the mobile terminal of FIG. 7A.

A slit extended portion communicated with slots may be formed on a case which covers the first slot antenna (ANT 1) and the second slot antenna (ANT 2). As the slit extended portion serves to extend slots of the slot antennas and to open an upper part of the slots, antenna efficiency can be more enhanced.

Figure 9A:
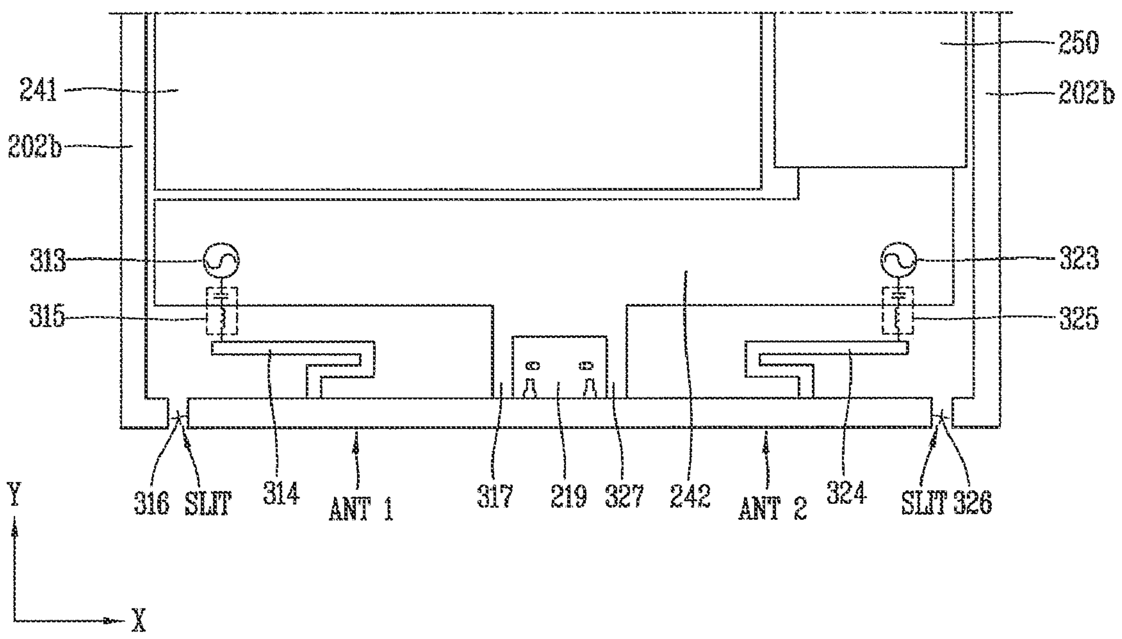
FIGS. 9A and 9B are views illustrating a modification embodiment of FIG. 7B.
Figure 9B:
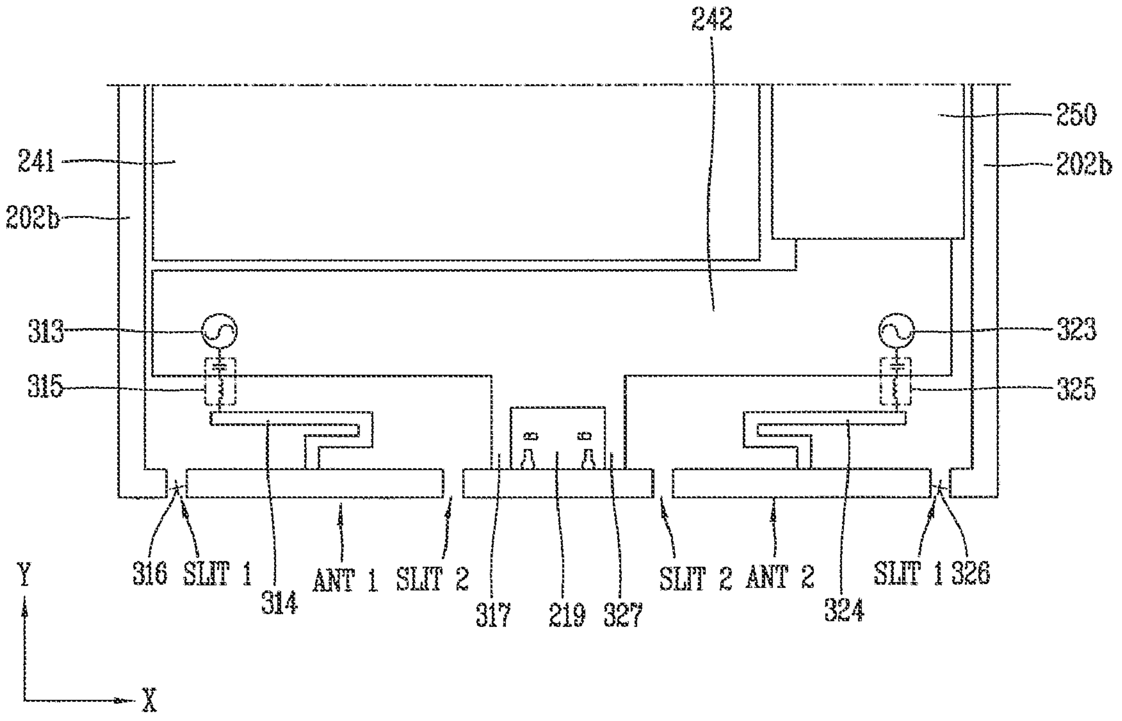

FIGS. 9A and 9B are views illustrating a modification embodiment of FIG. 7B.

Referring to FIG. 7A, a slit is formed so that a slot is open in a horizontal direction (X-axis direction) of the terminal body. In this case, if a user holds the terminal body of which appearance is formed by the conductive case, the user's palm covers the slit where main radiation from the antenna device is performed. This may cause a hand effect which results in decrease of radiation efficiency of the antenna device.

FIGS. 9A and 9B illustrate a mobile terminal where a slit is formed in a vertical direction (Y-axis direction) so as to prevent lowering of antenna efficiency due to a hand effect. As aforementioned, the slit may be formed to be covered by a non-conductive member.

FIG. 9B illustrates that conductive members of antenna devices are defined by forming another slit (SLIT 2) at a lower middle region of the mobile terminal. More specifically, in FIG. 9B, conductive members of different antenna devices are separated from each other for insulation. That is, another silt (SLIT 2) is formed between conductive members.

Figure 10:
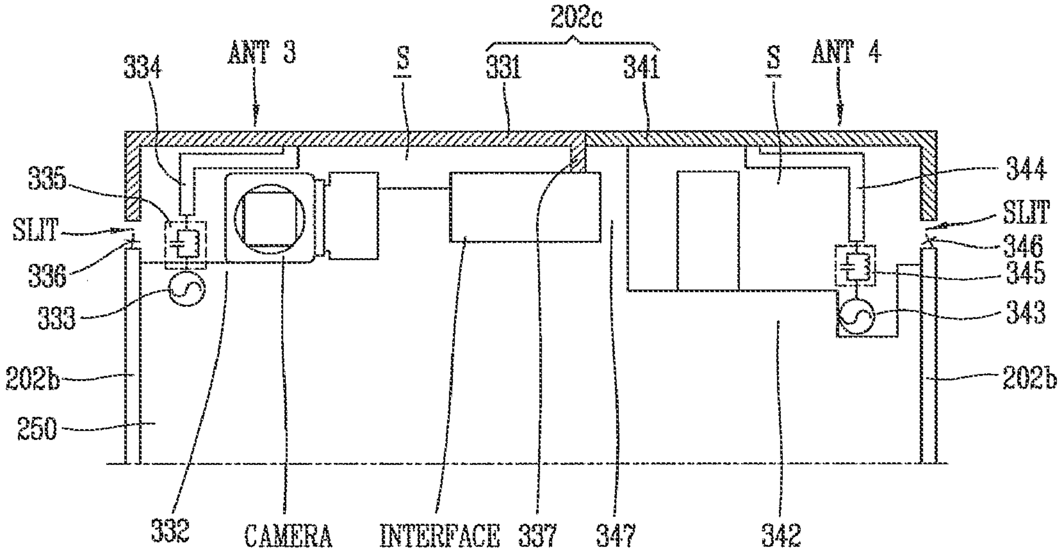
FIG. 10 is a view illustrating an example where antenna devices are mounted to another position of a mobile terminal.

FIG. 10 is a view illustrating an example where antenna devices are mounted to another position of a mobile terminal.

Antenna devices according to embodiments of the present disclosure may be formed at an upper part of the terminal body. A third antenna device (ANT 3) and a fourth antenna device (ANT 4) are formed at an upper part of the terminal body, and a conductive case 202*c* which constitutes an upper part of the terminal body serves as conductive members of the antenna devices. Slits are formed at conductive members 331 and 341 of the third antenna device (ANT 3) and the fourth antenna device (ANT 4).

In a case where the third antenna device (ANT 3) and the fourth antenna device (ANT 4) operate as slot antennas, the third antenna device (ANT 3) and the fourth antenna device (ANT 4) may comprise conductive members 331, 332, 341 and 342, feeding portions 333 and 343, and feeding extension portions 334 and 344.

The third antenna device (ANT 3) and the fourth antenna device (ANT 4) may operate as the aforementioned slot antennas. However, at least one of the antenna devices may operate as a folded dipole type antenna as later explained.

As one member of the antenna device is implemented as the conductive case, a plurality of antennas may be implemented at a smaller space inside the mobile terminal. Further, an antenna performance is not influenced by electric devices disposed near the antenna devices.

Figure 11A:
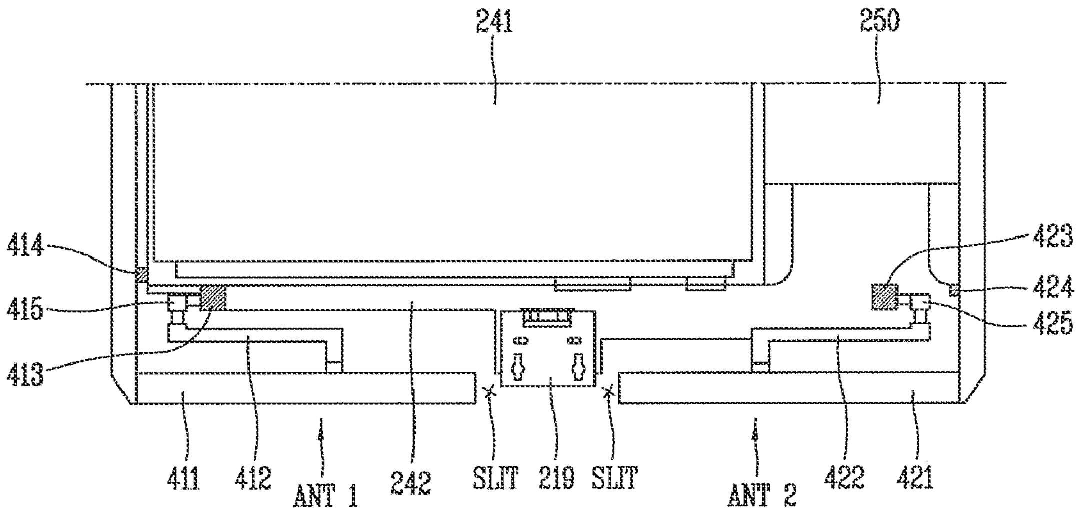
FIGS. 11A and 11B are conceptual views of a mobile terminal having antenna devices according to a second embodiment of the present disclosure.
Figure 11B:
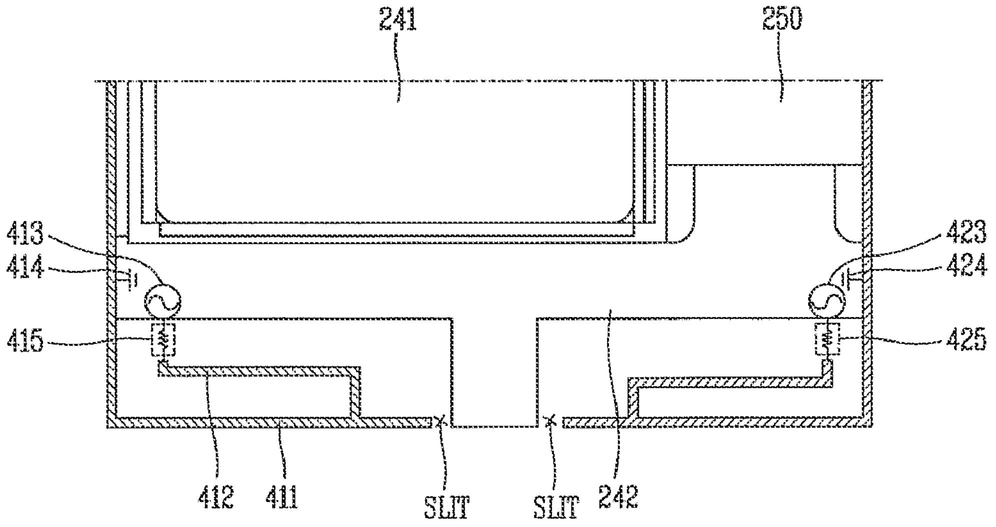
Figure 11C:
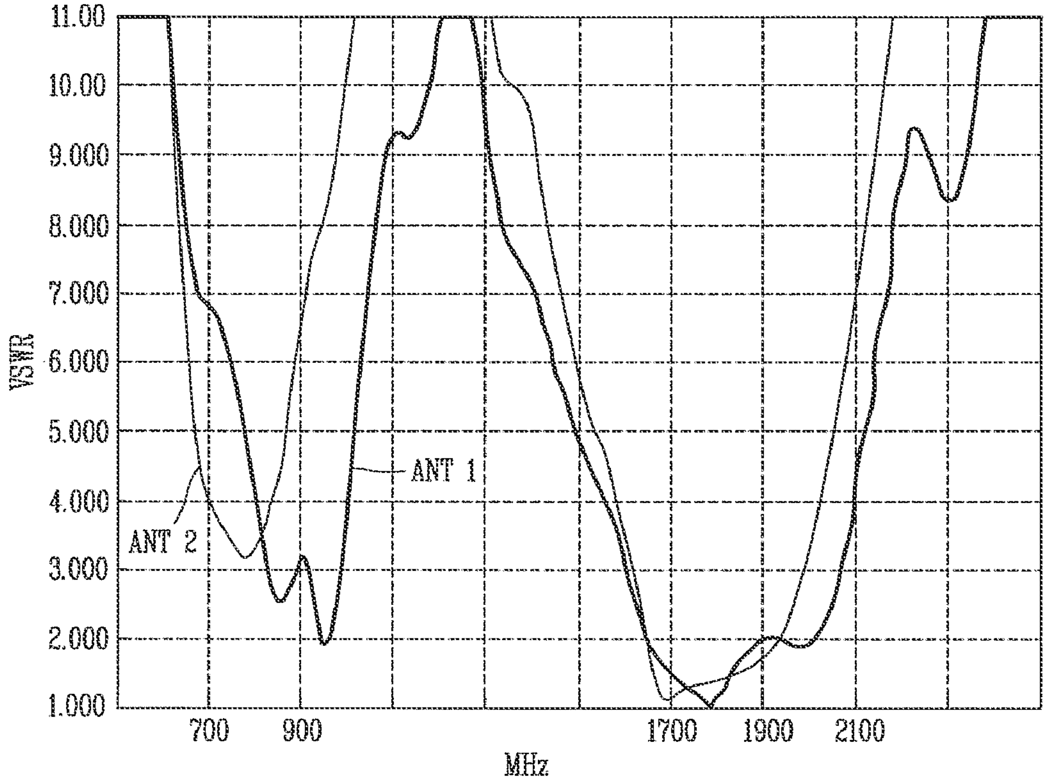
FIG. 11C is a view illustrating a voltage standing wave ratio (VSWR) according to a frequency of the antenna devices of FIG. 11A.

FIGS. 11A and 11B are conceptual views of a mobile terminal having antenna devices according to a second embodiment of the present disclosure, and FIG. 11C is a view illustrating a voltage standing wave ratio (VSWR) according to a frequency of the antenna devices of FIG. 11A. Especially, FIGS. 11A and 11B illustrate antenna devices formed at part ‘A’ in the mobile terminal shown in FIG. 3.

Referring to FIG. 11A, a first antenna device (ANT 1) and a second antenna device (ANT 2) are disposed at one side of a mobile terminal. The first antenna device (ANT 1) and the second antenna device (ANT 2) have the same configuration or similar configurations. Thus, only the first antenna device (ANT 1) will be explained.

The first antenna device (ANT 1) operates as a folded dipole antenna, and comprises a first conductive member 411 which forms part of an appearance of the terminal body, a third conductive member 412 which forms a first conductive loop together with the first conductive member 411, a first feeding portion 413, and a first grounding connector 414.

The first feeding portion 413 may be configured to connect the circuit board 250 mounted in the terminal body with the first conductive member 411, and configured to feed a first conductive member 511. The first feeding portion 413 may be implemented through a combination of a balun, a phase shifter, a distributor, an attenuator, an amplifier, etc.

A matching portion 415 for impedance matching may be formed between the first feeding portion 413 and the third member 412. The matching portion 415 may be implemented as a series element or a shunt element. In a case where the matching portion 415 is implemented as a series element, a reactance, an imaginary number part of an impedance, may be changed. For instance, an inductor may be controlled to have a high reactance, but a capacitor may be controlled to have a low reactance to thus change an impedance in a first frequency band. On the contrary, in a case where the matching portion 415 is implemented as a shunt element, a resistance, a real number part of an impedance, may be changed. For instance, an inductor may be controlled to have a high resistance, but a capacitor may be controlled to have a low resistance to thus change an impedance in a first frequency band.

FIG. 11B illustrates that the matching portion 415 is implemented as a series device. In a case where a first frequency band (low frequency band) is within the range of about 700~900 MHz, a capacitance may be within the range of 0.5~1.0 pF, and an inductance may be within the range of 3.0~7.0 nH.

If the matching portion 415 is formed between the first feeding portion 413 and the third member 412, a center frequency of a frequency band corresponding to a length of a first conductive loop can be shifted. More specifically, if a center frequency of a frequency band is shifted to a lower one due to the matching portion 415, an antenna device having a center frequency of a corresponding frequency band can be formed by a first conductive loop of a shorter length, because the frequency is in inverse proportion to the length of the first conductive loop of the antenna device.

The length of the first conductive loop corresponds to $\lambda/2$ with respect to a wavelength of a center frequency of a first frequency band. However, the length of the first conductive loop may be shortened due to the matching portion 415 implemented as a series element, which corresponds to $\lambda/4$ with respect to a wavelength of the center frequency of the first frequency band. The length of the first conductive loop may be increased or decreased by characteristics of components of the antenna device, or by influences from peripheral electric devices of the antenna device.

The second antenna device (ANT 2) has a similar configuration to the first antenna device (ANT 1). Under such configuration, A path, which is connected from a second feeding portion 423 to a second grounding connector 424 via a fourth member 422 and a second conductive member 421, forms a second conductive loop so that the second antenna device (ANT 2) can operate as a folded dipole antenna.

The first antenna device (ANT 1) and the second antenna device (ANT 2) may be disposed at one side of the mobile terminal in an adjacent manner, and each of them may be connected to a ground of the circuit board 250 by a grounding connector. The grounds of the first antenna device (ANT 1) and the second antenna device (ANT 2) may be separated from each other. That is, the first antenna device (ANT 1) may be connected to a first ground of the circuit board 250, and the second antenna device (ANT 2) may be connected to a second ground of the circuit board 250. In a case where the circuit board 250 is implemented as a multi-layered circuit board, the first ground and the second ground may be formed on different layers. If the grounds of the first antenna device (ANT 1) and the second antenna device (ANT 2) are independent from each other, the mobile terminal can reduce mutual coupling and an envelope correction coefficient between the first antenna device and the second antenna device.

Slits may be formed at one sides of the first conductive member 411 and the second conductive member 421, so that conductive members can be coupled thereto. In this case, the first conductive member 411 and the second conductive member 421 are defined by the conductive members. The first conductive member 411 and the second conductive member 421 have lengths corresponding to a specific frequency so that the antenna devices can resonate at a specific frequency.

Referring to FIGS. 11A and 11B, the first conductive member 511 of the antenna device according to this embodiment is formed at an upper end or a lower end of the mobile terminal. Main radiation with respect to radio signals is performed at parts adjacent to the slits of the first conductive member 411 and the second conductive member 421. In this embodiment, as a main radiation section is formed in a lengthwise direction, from a lower end of the mobile terminal toward outside, lowering of a radiation characteristic due to a hand effect at a high frequency band can be reduced.

Referring to FIG. 11C, even if the first antenna device (ANT 1) and the second antenna device (ANT 2) simultaneously operate at one side of the mobile terminal, they do not influence on each other, and a high antenna efficiency is implemented. Further, each antenna device which operates as a slot antenna has a high antenna efficiency in a multi-frequency band.

Figure 12A:
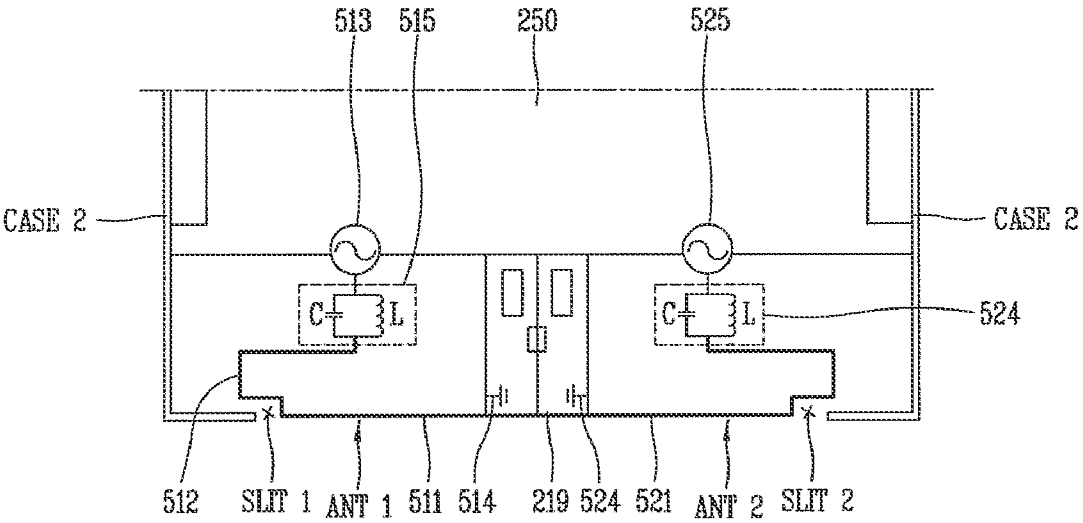
FIGS. 12A and 12B are views illustrating a modification embodiment of FIG. 11B.
Figure 12B:
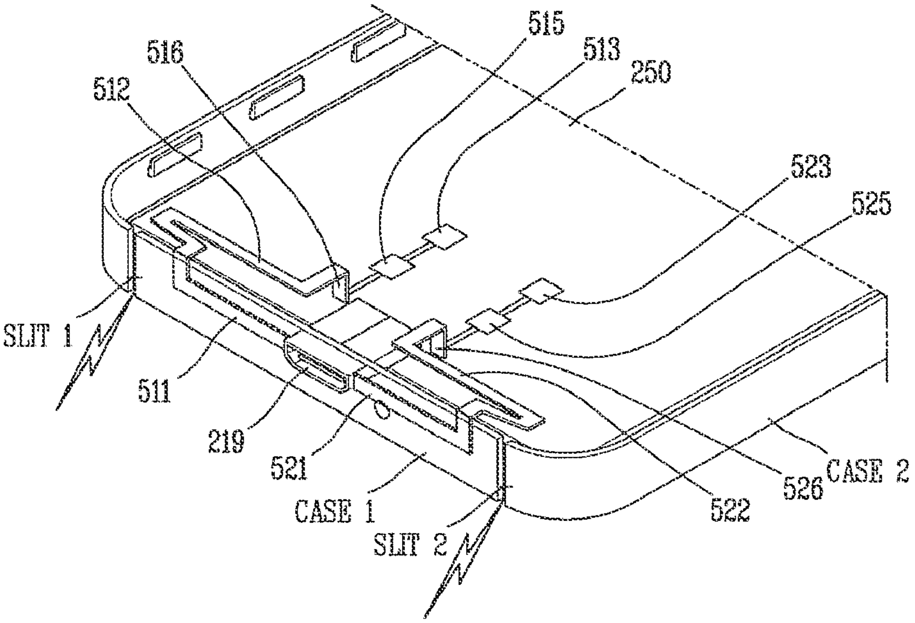

FIGS. 12A and 12B are views illustrating a modification embodiment of FIG. 11B.

Referring to FIG. 12A, a first antenna device (ANT 1) and a second antenna device (ANT 2) are disposed at one side of the mobile terminal. The first antenna device (ANT 1) and the second antenna device (ANT 2) have the same configuration or similar configurations, and thus only the first antenna device (ANT 1) will be explained.

The first antenna device (ANT 1) operates as a folded dipole antenna, and comprises a first conductive member 511, a third member 512, a first feeding portion 513, and a socket 219 which constitutes part of a first grounding connector 514.

A matching portion 515 for impedance matching may be formed between the first feeding portion 513 and the third member 512. The matching portion 515 may be implemented as a series element or a shunt element. In a case where the matching portion 515 is implemented as a series element, a reactance, an imaginary number part of an impedance, may be changed. For instance, an inductor may be controlled to have a high reactance, but a capacitor may be controlled to have a low reactance to thus change an impedance in a first frequency band. On the contrary, in a case where the matching portion 415 is implemented as a shunt element, a resistance, a real number part of an impedance, may be changed. For instance, an inductor may be controlled to have a high resistance, but a capacitor may be controlled to have a low resistance to thus change an impedance in a first frequency band.

If the matching portion 515 is formed between the first feeding portion 513 and the third member 512, a center frequency of a frequency band corresponding to a length of a first conductive loop including the first conductive member 511 and the third conductive member 512 can be shifted. More specifically, if a center frequency of a frequency band is shifted to a lower one due to the matching portion 515, an antenna device corresponding to a center frequency of a corresponding frequency band can be formed by the first conductive member 511 and the third member 512 of a shorter length, because the frequency is in inverse proportion to the length of the first conductive loop including the first conductive member 511 and the third member 512.

A transceiving circuit may be formed on one surface of a substrate. The transceiving circuit is connected to the first feeding portion 513. The transceiving circuit feeds the first conductive member 511 through the first feeding portion 513 and the matching portion 515. Under such configuration, the transceiving circuit transmits radio signals, or receives radio signals input to the first conductive member 511, through the first feeding portion 513 and the matching portion 515. The transceiving circuit having received the radio signals performs reception processes such as a frequency conversion process or a demodulation process.

The first antenna device (ANT 1) and the second antenna device (ANT 2) are connected to grounds of the mobile terminal through the socket 219. The socket 219 may be formed to pass through the first conductive member 511. An external device may be inserted into the socket 219. For instance, an interface device such as a multimedia interface connector (MMI connector) may be used. Alternatively, an interface device such as a charging port, a call earphone port, or a data cable port may be used.

The socket 219 may extend from the first conductive member 511 to the circuit board 250. The socket 219 contacting the circuit board 250 is ground-connected to the circuit board 250. That is, the socket 219 ground-connects the first conductive member 511 to the circuit board 250. Under such configuration, a path, which is from the first feeding portion 513 to the socket 219 via the first conductive member 511 and the third member 512, forms a first conductive loop so that the first antenna device (ANT 1) can operate as a folded dipole antenna.

The second antenna device (ANT 2) has a similar configuration to the first antenna device (ANT 1). Under such configuration, a path, which is from a second feeding portion 523 to the socket 219 via a fourth member 522 and a second conductive member 521, forms a second conductive loop so that the second antenna device (ANT 2) can operate as a folded dipole antenna.

The first antenna device (ANT 1) and the second antenna device (ANT 2) formed at one side of the mobile terminal are connected to grounds of the circuit board 250 through the socket 219. The socket 219 and the grounds are connected to each other by a first grounding connector (not shown). The first grounding connector (G) may be provided with at least two paths of different lengths, and may be provided with switches corresponding to the respective paths. The respective paths connect the grounds and the first conductive member 511 with each other, in different lengths, by switches thereof. The path serves as an electric passage for connecting a ground with a radiator, which may include at least one of a feeding board, a feeding clip and feeding lines. As feeding lines are formed in different lengths, the paths may have different lengths.

Non-conductive members may be coupled to two sides of the first conductive member 511 and the second conductive member 521. In this case, the first conductive member 511 and the second conductive member 521 are defined by the non-conductive members. The respective conductive members have a length corresponding to a specific frequency so that the antenna devices can resonate at a specific frequency.

In a case where side cases (CASE 2) of the mobile terminal adjacent to a conductive case (CASE 1) are formed of conductive members, the conductive case (CASE 1) and the side cases (CASE 2) are spaced from each other to form slits (SLIT 1 and SLIT 2). Non-conductive members are coupled to the slits (SLIT 1 and SLIT 2).

The conductive case (CASE 1) serves as a radiator of the first antenna device (ANT 2) or the second antenna device (ANT 2). To this end, the conductive case (CASE 1) may be separated from the side cases (CASE 2). The separated conductive cases may be connected to the first conductive member 511 serving as a radiator of the first antenna device (ANT 1), and the second conductive member 521 serving as a radiator of the second antenna device (ANT 2).

Referring to FIGS. 12A and 12B, the conductive case (CASE 1) of the antenna device according to this embodiment is formed at an upper end or a lower end of the mobile terminal. Radio signals radiate from two sides of the conductive case (CASE 1). In this embodiment, as a main radiation section is formed in a lengthwise direction, from a lower end of the mobile terminal toward outside, lowering of a radiation characteristic due to a hand effect at a high frequency band can be reduced.

Figure 13:
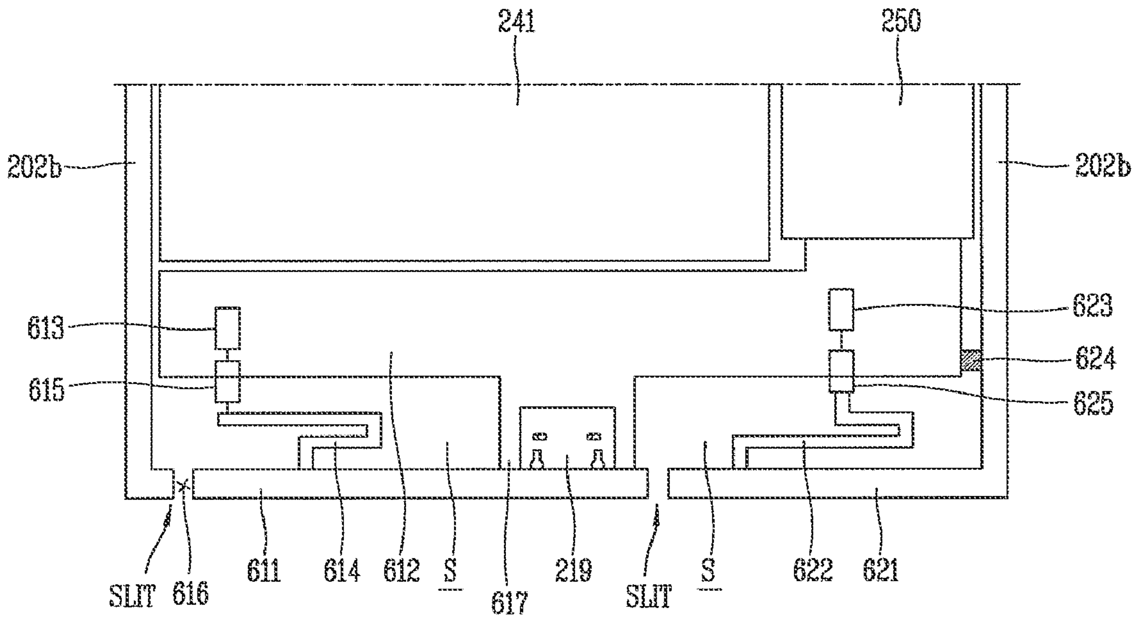
FIG. 13 is a conceptual view of a mobile terminal according to another embodiment of the present disclosure, in which one of a plurality of antennas is implemented as a slot antenna and another is implemented as a folded dipole antenna.

FIG. 13 is a conceptual view of a mobile terminal according to another embodiment of the present disclosure, in which one of a plurality of antennas is implemented as a slot antenna and another is implemented as a folded dipole antenna. Especially, FIG. 13 illustrates antenna devices formed at part ‘A’ in the mobile terminal shown in FIG. 3.

The first antenna device (ANT 1) may comprise a first conductive member 611, a third conductive member 612, a first feeding portion 613, a feeding extension portion 614, and a first matching portion 615. The first conductive member 611 and the third conductive member 612 may be implemented as conductive members, and define a slot (S) of the antenna device.

The second antenna device (ANT 2) operates as a folded dipole antenna, and comprises a second conductive member 621 which forms part of an appearance of the terminal body, a fourth conductive member 622 which forms a first conductive loop together with the second conductive member 621, a second feeding portion 623, a grounding connector 624, and a second matching portion 625.

The third conductive member 612 and the fourth conductive member 622 may be parts of the FPCB 242. That is, the third conductive member 612 may be implemented as an upper part of the FPCB 242, and the fourth conductive member 622 may be implemented as a lower part of the FPCB 242. Grounds of the third conductive member 612 and the fourth conductive member 622 may be separated from each other.

Alternatively, the third conductive member 612 may be implemented as the FPCB 242, and the fourth conductive member 622 may be implemented as the circuit board 250 of the mobile terminal. Under such configuration, grounds of the first antenna device (ANT 1) and the second antenna device (ANT 2) may be separated from each other.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:

a case made of a metallic material and forming a part of an appearance of the mobile terminal; and a circuit board comprising at least one transceiving circuit configured to process radio signals;

wherein the case comprises:

at least a part of a first conductive member, a second conductive member, and a third conductive member disposed at one side corresponding to an upper end or a lower end in a lengthwise direction of the mobile terminal and forming a part of the appearance of the mobile terminal;

a first slit disposed at an end of the first conductive member;

a second slit disposed at an end of the second conductive member;

a third slit disposed at the other end of the first conductive member; and at least one non-conductive member disposed at the first slit, the second slit, and the third slit, wherein:

the third conductive member is disposed between the first slit and the second slit;

the first slit and the second slit are located along a same surface of the one side of the mobile terminal;

the circuit board is electrically connected to the first conductive member via a first feeding device and to the second conductive member via a second feeding device;

the first conductive member is configured to operate as a part of a first antenna device;

the second conductive member is configured to operate as a part of a second antenna device; and the first antenna device and the second antenna device are configured to be operated by the at least one transceiving circuit.

2. The mobile terminal of claim 1, wherein the first conductive member is connected to a ground via a first grounding connector and the second conductive member is connected to the ground via a second grounding connector.

3. The mobile terminal of claim 2, further comprising a socket connectable to an external device formed at the third conductive member.

4. The mobile terminal of claim 1, wherein the first antenna device and the second antenna device are configured to be simultaneously operated in a same communication system.

5. The mobile terminal of claim 1, wherein the first antenna device and the second antenna device are configured to operate in LTE frequency bands.

6. The mobile terminal of claim 1, wherein the first antenna device is configured to transmit or receive a first signal in a first frequency band, and the second antenna device is configured to transmit or receive a second signal in a second frequency band different from the first frequency band.

7. The mobile terminal of claim 1, wherein the first antenna device is configured to transmit or receive a first signal in a first frequency band, and the second antenna device is configured to transmit or receive a second signal in the first frequency band.

8. The mobile terminal of claim 1, wherein the at least one transceiving circuit is configured to simultaneously feed the first conductive member and the second conductive member.

9. The mobile terminal of claim 1, wherein the circuit board comprises:

a first circuit board comprising the at least one transceiving circuit; and a second circuit board comprising the first feeding device and the second feeding device.

10. The mobile terminal of claim 9, further comprising:

a first cable connecting the first circuit board with the first feeding device; and a second cable connecting the first circuit board with the second feeding device, wherein the first and second feeding devices are disposed on the second circuit board.

11. The mobile terminal of claim 1, wherein the first antenna device and the second antenna device are configured to operate in a Multiple-Input Multiple-Output (MIMO) system or a diversity system.

12. The mobile terminal of claim 1, wherein the at least one transceiving circuit is configured to control the first antenna device and the second antenna device to transmit or receive signals in a same frequency band.

13. The mobile terminal of claim 1, wherein the at least one transceiving circuit is configured to control the first antenna device and the second antenna device to transmit or receive signals in different frequency bands.

* * * * *